UNITED STATES PATENT OFFICE.

OTTO EINAR GELERTSEN, OF WESTFIELD, NEW JERSEY, ASSIGNOR TO GREENFIELD PAPER BOTTLE COMPANY, OF NEW YORK, N. Y., A CORPORATION OF NEW JERSEY.

PROCESS FOR PURIFYING WATERPROOFING COMPOSITIONS.

1,310,158.     Specification of Letters Patent.     Patented July 15, 1919.

No Drawing.     Application filed June 5, 1916. Serial No. 101,818.

*To all whom it may concern:*

Be it known that I, OTTO EINAR GELERTSEN, a subject of the King of Sweden, and a resident of Westfield, county of Union, and State of New Jersey, have made certain new and useful Improvements in Processes for Purifying Waterproofing Compositions, of which the following is a specification.

The invention relates to the purifying of waterproofing compositions which comprise resin and hydrocarbon waxes or oils. It is frequently desirable to waterproof the paper of receptacles or bottles which are employed for containing foods, often in liquid form.

Applicant has found it practicable to utilize for such waterproofing a composition which contains resin and paraffin or other hydrocarbons. The resin itself gives a brittleness to the composition and in some forms is quite sticky so that it can be relied upon to impart to the composition a gluing action which renders the composition suitable as a medium for gluing or securing different parts of paper to each other. Paraffin or other hydrocarbon wax can be mixed with the resin and if the mixture should be too soft hardening substances can be added, such as carnauba wax. The resin which is suitable for this purpose is a commercial resin. Commercial resin always contains some foreign substances some of which emit objectionable odors, some of which give a disagreeable taste and some of which affect the contents of the receptacle or bottle. It, therefore, becomes advisable to remove or eliminate these sources of objection.

The object of the present invention is, as above indicated, to treat a composition which is suitable for waterproofing in a manner so that the objectionable features above noted will be eliminated.

According to the present invention a mixture containing commercial resin and such hydrocarbon waxes as remain in the composition is subjected to the action of a current of air that is finally heated to approximately a temperature of from 100 to 120° C. with the result that impurities which are objectionable on account of either odor, or taste, or both, are transformed into compounds of such a character as will make it possible to eliminate them. Some of the impurities or some of the resulting compounds are volatile and the volatiles are caused to pass off from the mixture by means of the heated air which is passed into and in a practical sense through the mixture. Some of the resulting compounds are insoluble in the mixture of the waterproofing composition and those are easily removable as by a filtration process.

The purifying process that is performed by injecting into and passing through the mixture air in heated condition may be accentuated or accelerated by the introduction into the mixture of catalytic agents, such as chromium, manganese or iron, or compounds thereof. Such catalytic agents or compounds should be added in comparatively small quantities. During the time the air is being passed through the waterproofing composition it is advisable and in fact practically necessary to mechanically stir or agitate the mixture. If this mechanical stirring or agitation is not maintained during the operation of passing the air in a heated condition through the waterproofing composition the reactions which take place in the mixture having therein catalytic agents such as chromium manganese or iron will be locally enhanced in a manner which is liable to risk the ultimate quality of the waterproofing composition. The function of the catalytic agents, such as chromium, manganese or iron, or compounds thereof, is to assist, as above indicated, the purifying process. The manner in which this is performed is not definitely known but applicant considers that each of these catalytic agents, or their compounds, operates to absorb oxygen from the air to serve as carriers of said oxygen and to subsequently dispose of the oxygen. They may also be considered as transforming agents or transferring agents whereby oxygen is readily delivered from the air to the impurities within the mixture to be purified. It may be here pointed out that the paraffin which has been included in the waterproofing composition acts as a modifier for the resin and it may be considered also to act as a solvent for the resin.

It will be manifest that the waterproofing composition contains or may eventually contain other substances or compounds than resin and hydrocarbon wax or oil, but two essential elements of the waterproofing composition are the resin and a hydrocarbon wax or oil. Commercial resin is the substance which is employed to make waterproofing composition and it is the commercial resin which contains impurities that supply the objectionable features. The hydrocarbon wax or oil while essential as an element of the ultimate waterproofing composition is also essental as an element for the purifying of resin and it has been found that by passing air in a heated condition into and through a mixture containing commercial resin and a hydrocarbon wax or oil, according to the invention herein described, there is a removal of all the substances which will volatilize. It has also been found that the passing of air into the composition in the manner above described will cause a precipitation and formation into an insoluble condition of all objectionable substances that are not removed by being volatilized, thus transforming such objectionable substances into a condition which permits the ready separation of the purified waterproofing composition and said insoluble objectionable substances or compounds thereof.

It will also be manifest that the invention may be performed and realized in different ways from that above described without departing from the spirit and scope thereof.

What I claim is:—

1. In the purifying of a waterproofing composition or mixture having therein commercial resin and hydrocarbon wax or oils, the method which comprises passing air when heated to a temperature of 100 to 120° C. through the waterproofing composition to be purified.

2. In the purifying of waterproofing compositions having therein a mixture of resin and hydrocarbon wax or oils, the method which involves the passing of air heated to a temperature of from 100 to 120° C. into the waterproofing composition to be purified, continuing the passing of air into said waterproofing composition until the impurities to be removed and which are volatile have passed from the waterproofing composition, and finally separating from the waterproofing composition any insoluble impurities or compounds mixed with the waterproofing composition.

3. In the purifying of waterproofing compositions having therein a mixture of resin and hydrocarbon wax or oils, the method which involves the passing of air heated into the waterproofing composition to be purified, continuing the passing of air into said waterproofing composition until the impurities to be removed and which are volatile have passed from the waterproofing composition, and finally separating from the waterproofing composition any insoluble impurities or compounds mixed with the waterproofing composition.

4. In the purifying of a waterproofing composition comprising resin and hydrocarbon wax or oils, the method which comprises inserting into the waterproofing composition to be purified a catalytic agent suitable to enhance or facilitate the oxidation of the impurities by air, passing air which is heated to a temperature above 100° C. into said waterproofing composition in the presence of said catalytic agent, continuing the passing of air in the manner specified until the volatile substances have passed from the waterproofing composition, and finally separating the waterproofing composition from the catalytic agent and any insoluble impurities, or compounds thereof, which are in the waterproofing composition.

5. In the purifying of a waterproofing composition comprising resin, hydrocarbon wax or oils, the method which comprises subjecting the waterproofing composition to the action of heated air in the presence of a catalytic agent, such as chromium, manganese or iron, or a compound or compounds thereof, until the impurities, or compounds thereof, which are volatile have passed from the waterproofing mixture to be purified, and separating the waterproofing composition from such impurities, or compounds thereof, as are not soluble in the waterproofing mixture.

6. In the purifying of a waterproofing composition comprising a mixture of resin, hydrocarbon wax or oils, by the employment of air which is heated to a temperature of 100° C. or more, the method which comprises passing said air into the mixture to be purified and in the presence of metals or substances which accelerate or accentuate the purifying process, and separating a purified waterproofing composition from any remaining impurities, or compounds thereof, which are insoluble in the waterproofing composition.

7. In the purifying of a waterproofing composition which is made by mixing commercial resin, hydrocarbon wax or oils, by the method which comprises bringing the air and waterproofing mixture to be purified into contact with each other in the presence of a catalytic agent while the air is at a temperature of 100° C. or more, and separating the purified mixture from any insoluble impurities, or compounds thereof, which remain in the purified material at the end of the air treatment.

8. In the purifying of a waterproofing composition or mixture having resin and hydrocarbon wax or oils, the method which comprises the subjecting of the waterproofing composition to the action of air in the presence of a catalytic agent by passing air heated to approximately 100° C. or slightly more into the composition.

This specification signed and witnessed this 2d day of June A. D. 1916.

OTTO EINAR GELERTSEN.

Signed in the presence of—
 EDWIN A. PACKARD,
 G. MCGRANN.